United States Patent
Alfier et al.

(10) Patent No.: US 10,321,637 B2
(45) Date of Patent: Jun. 18, 2019

(54) LIGHTING DEVICE, FOR INSTANCE FOR GREENHOUSE LIGHTING, AND CORRESPONDING METHOD OF USE

(71) Applicant: OSRAM GmbH, Munich (DE)

(72) Inventors: Alberto Alfier, Treviso (IT); Nicola Schiccheri, Padua (IT)

(73) Assignee: OSRAM GMBH, Munich (DE)

( * ) Notice: Subject to any disclaimer, the term of this patent is extended or adjusted under 35 U.S.C. 154(b) by 82 days.

(21) Appl. No.: 15/214,536

(22) Filed: Jul. 20, 2016

(65) Prior Publication Data

US 2017/0020084 A1 Jan. 26, 2017

(30) Foreign Application Priority Data

Jul. 21, 2015 (IT) .................. 102015000036279

(51) Int. Cl.

| | | |
|---|---|---|
| *F21V 9/00* | (2018.01) | |
| *A01G 9/20* | (2006.01) | |
| *A01G 7/04* | (2006.01) | |
| *F21V 29/503* | (2015.01) | |
| *F21V 29/70* | (2015.01) | |
| *F21V 7/00* | (2006.01) | |
| *F21V 7/04* | (2006.01) | |
| *F21Y 105/16* | (2016.01) | |
| *F21Y 113/13* | (2016.01) | |
| *F21Y 115/10* | (2016.01) | |

(52) U.S. Cl.
CPC .............. *A01G 9/20* (2013.01); *A01G 7/045* (2013.01); *F21V 7/0091* (2013.01); *F21V 7/041* (2013.01); *F21V 29/503* (2015.01); *F21V 29/70* (2015.01); *F21Y 2105/16* (2016.08); *F21Y 2113/13* (2016.08); *F21Y 2115/10* (2016.08); *Y02P 60/149* (2015.11)

(58) Field of Classification Search
CPC ... F21V 9/16; F21V 14/06; F21V 9/08; F21V 29/70
USPC ........................................... 362/84, 231, 800
See application file for complete search history.

(56) References Cited

U.S. PATENT DOCUMENTS

| | | | |
|---|---|---|---|
| 5,660,461 A | 8/1997 | Ignatius et al. | |
| 6,042,250 A | 3/2000 | Stragnola | |
| 6,407,830 B1 * | 6/2002 | Keithley | ............... H04N 1/484 250/208.1 |
| 6,921,182 B2 | 7/2005 | Anderson, Jr. et al. | |

(Continued)

FOREIGN PATENT DOCUMENTS

| | | |
|---|---|---|
| CN | 201954327 U | 8/2011 |
| KR | 100879711 B1 | 1/2009 |

(Continued)

OTHER PUBLICATIONS

Italian Search Report based on Application No. 102015000036279(8 Pages) dated Mar. 22, 2016 (Reference Purpose Only).

(Continued)

*Primary Examiner* — Jamara A Franklin
(74) *Attorney, Agent, or Firm* — Viering, Jentschura & Partner MBB

(57) ABSTRACT

Various embodiments may relate to a lighting device, e.g. for greenhouse lighting, including a substrate with an array of electrically-powered light radiation sources, e.g. power LEDs. The sources of array are arranged in a first set and in a second set to emit a blue radiation and a red radiation, respectively.

14 Claims, 2 Drawing Sheets

(56) References Cited

U.S. PATENT DOCUMENTS

| | | |
|---|---|---|
| 8,174,688 B2 | 5/2012 | Shi et al. |
| 8,944,631 B2 | 2/2015 | Pan et al. |
| 2001/0004251 A1* | 6/2001 | Kurematsu ....... G02F 1/133526 345/88 |
| 2014/0177221 A1 | 6/2014 | Caldon et al. |
| 2014/0215917 A1 | 8/2014 | Suzuki et al. |

FOREIGN PATENT DOCUMENTS

| | | |
|---|---|---|
| KR | 100906226 B1 | 7/2009 |
| WO | 2010074528 A2 | 7/2010 |
| WO | 2011044931 A1 | 4/2011 |

OTHER PUBLICATIONS

European Search Report based on application No. 16179650.3 (8 pages) dated Dec. 6, 2016 (Reference Purpose Only).

\* cited by examiner

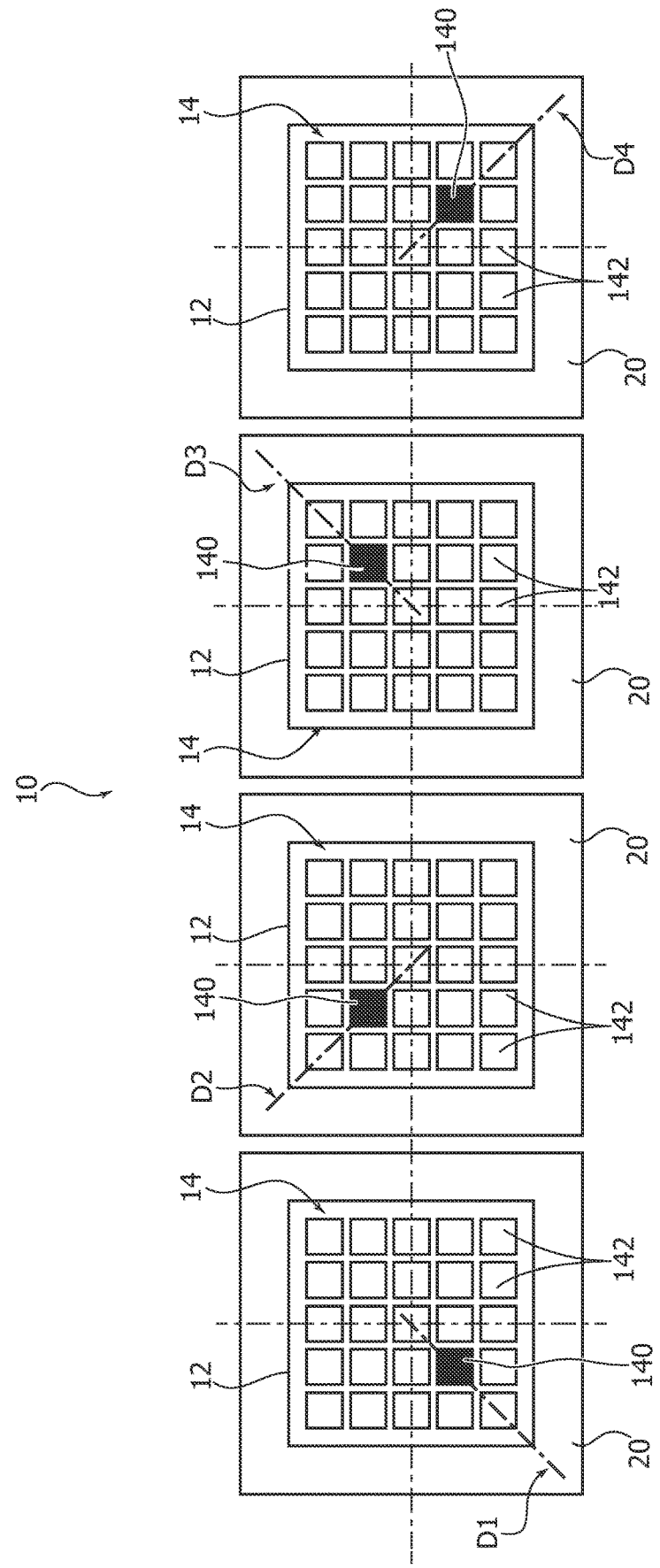

LIGHTING DEVICE, FOR INSTANCE FOR GREENHOUSE LIGHTING, AND CORRESPONDING METHOD OF USE

CROSS-REFERENCE TO RELATED APPLICATION

This application claims priority to Italian Patent Application Serial No. 102015000036279, which was filed Jul. 21, 2015, and is incorporated herein by reference in its entirety.

TECHNICAL FIELD

Various embodiments relates generally to lighting devices.

One or more embodiments may refer to lighting devices employing electrically powered solid-state light radiation sources, such as LED sources.

One or more embodiments may find application in greenhouse lighting.

BACKGROUND

Lamps such as High Pressure Sodium (HPS) lamps, which are employed to enhance the growth of plants, may exhibit various limits and drawbacks.

For example, plants are able to absorb only a small fraction of the light spectrum of such lamps.

Moreover, some lamps emit UV radiation which, if not properly filtered, may be harmful both to plants and to operators e.g. in a greenhouse.

In addition, some lamps may contain metals harmful to the environment, and moreover they may be fragile and have a short operating life.

LED sources may be a valid solution to replace such traditional light sources, e.g. because they have a high-intensity light emission in a wavelength range adapted to foster plant growth.

Moreover, the possibility is given to use LEDs with different light emission features, so as to influence the overall spectral features of the emitted radiation.

The possible use of LED light radiation sources for plant lighting, e.g. in the horticultural sector, is the object of various patents.

For example, patent KR 100879711 describes a mixing of radiations produced by LEDs in the ranges of 640 to 675 nm and 425 to 455 nm, with different ratios: 9:1, 8:2, 7:3 and 6:4.

U.S. Pat. No. 6,921,182 B2 describes the use of orange, red and blue LED sets having different output angles.

U.S. Pat. No. 8,944,631 B2 describes a LED lighting unit of a mixed type, employing various units with red and blue LEDs. Each unit comprises three blue LEDs in a triangle, and eight red LEDs in four sets, which are arranged in a rectangular configuration.

U.S. Pat. No. 5,660,461 A describes a module comprising one or more U-shaped substrates, one substrate acting as a heatsink, and a cone-shaped reflector, being aligned so that the LED is located at the centre of the cone, the device comprising a plurality of modular units that are snapped together.

U.S. Pat. No. 6,042,250 A discloses a reflector having a plurality of flutes, adapted to reflect the light emitted by a source arranged at the focal point of the reflector, so as to obtain a uniform distribution of the radiation. The reflector is adapted to operate with various kinds of sources without jeopardizing the uniformity or the desired level of lighting in an area where plants are grown.

U.S. Pat. No. 8,174,688 B2 discloses a method for determining the number of different light sources provided in a lighting device having different RGB ratios.

SUMMARY

One or more embodiments aim at providing an improved lighting device, adapted to be used e.g. for greenhouse lighting.

According to one or more embodiments, said object is achieved thanks to a lighting device having the features specifically set forth in the claims that follow.

One or more embodiments may also concern a corresponding method of use.

One or more embodiments lead to the achievement of one or more of the following advantages:

the possibility of obtaining a certain level of irradiance in the plane where plants are located, while ensuring a certain ratio between the radiometric power of blue and red radiation, the possibility of taking into account that the level of irradiance depends on the installation height of the lighting device and on the area of the lit surface (e.g. the plants may be arranged on tables which are raised from the floor, on a square surface), the possibility being given for the emitted radiation beam to correspond to a parallelogram shape (e.g. a square or a rectangular shape) with the further option to increase irradiance in the area where plants are placed while reducing it in the surrounding areas, the possibility of regulating the ratio between different sources (e.g. blue and red) in a specific way, e.g. 1:24, according to the needs.

Irradiance is a radiometric quantity of the International System, and it indicates the flux impinging on an orthogonal surface per unit of surface area; the unit of measure is watt per square meter ($W/m^2$).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a modular lighting device according to one or more embodiments.

DESCRIPTION

Figure 2:
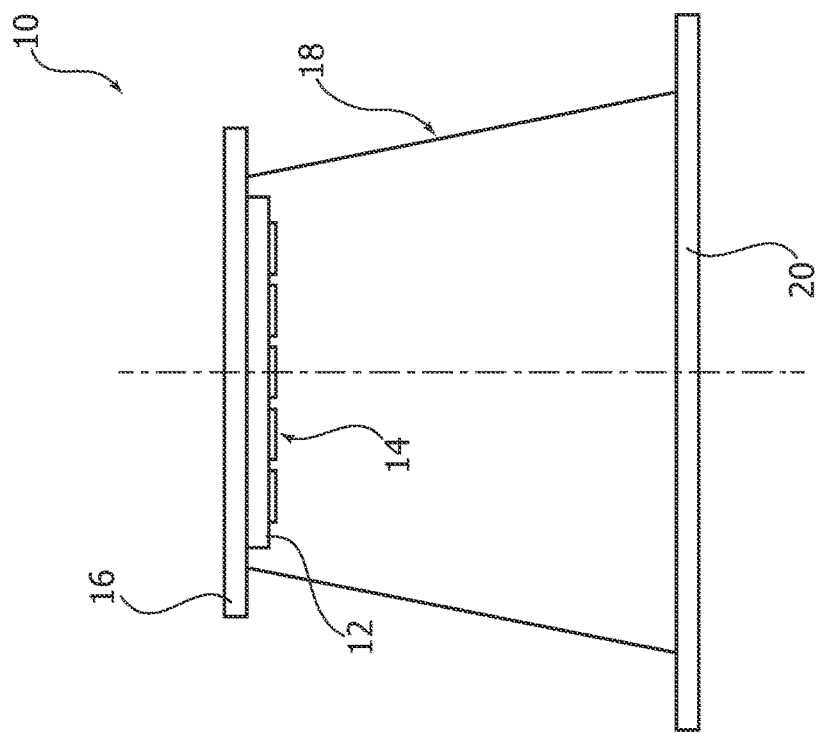
FIG. 2 is a view of the device in FIG. 1, viewed in side elevation.

In the following description, numerous specific details are given to provide a thorough understanding of exemplary embodiments. One or more embodiments may be practiced without one or several specific details, or with other methods, components, materials, etc. In other instances, well-known structures, materials, or operations are not shown or described in detail to avoid obscuring various aspects of the embodiments. Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only, and therefore do not interpret the extent of protection or the scope of the embodiments.

In the Figures, reference 10 denotes a lighting device comprising one (single) support board 12 (e.g. similar to a Printed Circuit Board, PCB) mounting an array of electrically powered light radiation sources 14.

In one or more embodiments these sources are LED light radiation sources 14, e.g. High Power LEDs. The LEDs may be of the type marketed under the trade mark OSLON® Square by companies belonging to the same corporation as the Applicants'.

In one or more embodiments the LED light radiation sources may constitute a square package. This shape enables a side-by-side arrangement of the light radiation sources, in a densely clustered array.

In one or more embodiments, board (PCB) 12 may be arranged on a support member 16 having the function of a heatsink, adapted to dissipate the heat produced by sources 14 in operation, e.g. so that the LED junction temperature remains within a peak value according to specifications.

In one or more embodiments, such an assembly may exhibit low thermal resistance, making it possible to achieve high efficiency, e.g. with high current driving.

In one or more embodiments as exemplified herein, light radiation sources 14 are arranged in a matrix array, e.g. a square array. Figures depict, by way of example, a square 5×5 matrix.

In one or more embodiments, the LEDs 14 in the array may have the same package but different emission features.

E.g., in one or more embodiments, array 14 may comprise a first and a second sets of LEDs, respectively emitting a blue and a red radiation.

In one or more embodiments, the emission of blue radiation may have a spectrum (with a rather narrow peak) centred at 444 nm, while the emission of red radiation may have a spectrum (again, with a rather narrow peak) centred at 660 nm.

In one or more embodiments, the ratio between blue and red radiometric power may be approximately 0.05 in favour of the red radiation.

In one or more embodiments, such a result may be achieved by using blue and red sources in a ratio of 1:24.

Figure 1:
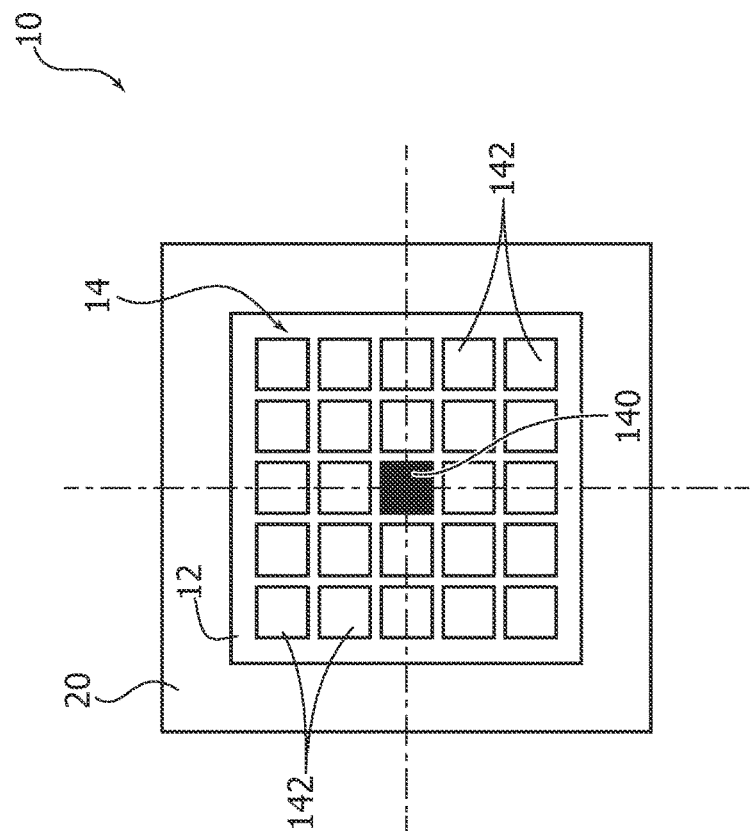
FIG. 1 is a view of a lighting device according to one or more embodiments, viewed from the front.

For example, in an arrangement as exemplified in FIG. 1, such a result may be achieved by arranging a blue LED 140 centrally in the array (a square 5×5 array in the presently considered example), and by surrounding the blue LED with a plurality of red LEDs 142.

In one or more embodiments, in order to take into account that the LEDs arranged centrally in the array (e.g. blue LED 140 in FIG. 1) may experience a heavier thermal load than the surrounding LEDs, a pitch e.g. of 1 mm may be adopted (instead of smaller, e.g. 0.5 mm, pitches that are theoretically possible) so as to facilitate the thermal management of array 14.

In one or more embodiments (see e.g. FIG. 2), the array of sources 14 may be coupled to a reflector 18 having e.g. the shape of a truncated pyramid.

In one or more embodiments, reflector 18 may reflect the rays most tilted with respect to the optical axis of array 14 (shown as a dash-dot line) towards the front emission area, while guiding them towards the lighting area (e.g. where plants are located).

In one or more embodiments, reflector 18 having the shape of a truncated pyramid may have a square cross-section, so as to generate a square beam corresponding to the arrangement of the plants on the tables, where they are usually placed in current horticultural applications.

In one or more embodiments, reflector 18 may originate a square lighting distribution on an area of 10 m$^2$ located approximately 3 m away from device 10. This leads to obtaining, on that area, a uniform irradiance profile, and therefore the uniformity of lighting which is required for the presently considered application.

In one or more embodiments, the ratio of the height of reflector 18 (i.e. the distance between the input plane and the output plane of reflector 18) to the side of said input plane, which is assumed as being square, may amount approximately to 3.5.

In one or more embodiments, at the output plane of reflector 18 there may be provided a cover 20, e.g. a flat cover, of a plastic material or glass, which is permeable to the radiation emitted by sources 14.

The choice of the sizes previously listed is however not mandatory.

Similarly, in one or more embodiments, reflector 18 may have a shape other than a truncated pyramid, having e.g. a different diverging ("flared") shape, e.g. conical or parabolic, or even a more complex shape.

In one or more embodiments, reflector 18 may have faceted surfaces, with concave or convex faces. Moreover, the possibility is given to adapt the shape of the emitted radiation to various lighting needs.

In one or more embodiments, cover 20 may be flat as shown, and/or may have pillow microstructures, a surface sculpting, for example with cylindrical elements, or a grained surface.

In one or more embodiments reflector 18 may have inner walls treated with an aluminization coating, so that they acquire reflective properties.

In one or more embodiments, reflector 18 may have lambertian scattering features, e.g. as in the case of a white material. One or more embodiments may envisage a roughened surface having diffusive properties. Indeed, a surface roughening treatment may generate a diffusive reflection depending on the material and on the roughness values, i.e. with the light diffusion with respect to the specular direction depending on the properties of the material and of the surface. A rough surface may scatter light at 5, 10, 20° with respect to the specular direction. Lambertian scattering follows the law of cosines and is typical of white materials, bulk and microstructured diffusers. By way of example only, with reference to one or more embodiments, with a reflector with lambertian surfaces having a reflectivity of 80% an average irradiance value may be obtained which is 40% less than the average irradiance value achievable with specular reflective surfaces.

In one or more embodiments, different areas of reflector 18 may have either the same or different optical properties, e.g. the reflector surface may have specular reflective properties in some areas and diffusive reflective properties in other areas.

In one or more embodiments, reflector 18 may be a TIR (Total Internal Reflection) collimator, wherein the rays impinging on the side walls of the collimator are reflected in conditions of total internal reflection.

In one or more embodiments, the output surface of such a collimator may have millimeter-sized or micrometer-sized structures (e.g. bumps, so-called pillows or prisms of different shapes: square, hexagonal, concave, convex etc.), or it may have a roughened surface.

In one or more embodiments, as exemplified in FIG. 1, blue LED 140 may be arranged centrally in array 14.

In one or more embodiments the arrangement may be off-centred, as better detailed in the following with reference to the modular structure of FIG. 3, e.g. with a blue LED 140 (in the following, for simplicity, we will assume the presence of only one blue source in the array, although this condition is not strictly mandatory) arranged in the middle of one of the four "quarters" into which an array, e.g. the square array of FIG. 1, may be divided.

In this case a situation may ensue wherein the irradiance pattern produced by blue LED 140 is not homogeneous with respect to the pattern generated by the set of red LEDs 142.

In the case of a central location (FIG. 1) a reduction of irradiance values may be detected in the middle of the arrangement.

If the blue LED is placed in the middle of one of the quarters of a square array, the lowest value (i.e. the "hole") of irradiance is off-centred with respect to the overall irradiance pattern.

In one or more embodiments it is possible to modify such an asymmetry as schematically shown in FIG. 3, exemplifying the possibility of implementing a modular structure comprising several modules, each of which has a structure as shown in FIG. 1.

FIG. 3 refers, by way of example only, to a modular structure comprising four modules in mutual alignment.

Such a choice, of course, is by no way mandatory. E.g., it is possible to implement lighting devices including a rather high number of modules, e.g. 36 modules arranged in a square 6×6 array or in a rectangular 3×12 array, i.e. comprising three rows of 12 modules each: for a direct reference, the assembly shown in FIG. 3 corresponds to a 1×4 matrix, i.e. one row comprising four modules.

The use of such a system of several modules (which may have a common cover 20) leads to the possibility of obtaining higher irradiance levels on the plane where plants are located.

Another advantage may derive from the fact that, since a module may achieve a square lighting pattern on a plane, by arranging two or more modules side by side a superposition of square lighting patterns may be obtained, thus increasing the overall irradiance homogeneity.

Moreover, a modular system may replace current systems employing HPS lamps also as regards power, by using a suitable number of LEDs or, more generally, by adapting the overall number of LEDs in the array. In this way, for example, existing lighting systems may be replaced without the need of changing installation conditions, e.g. within a greenhouse.

Moreover, as exemplified in FIG. 3, the directions of offset from the centre of the array of off-centred LEDs 140 may be rotated from module to module, so that an overall homogeneity of the irradiance pattern may be achieved.

For example, referring to the viewpoint of FIG. 3, blue LEDs 140 (one for each array in the presently considered embodiment) are shown as located in positions respectively rotated by 90° which, advancing from left to right in FIG. 3, may be roughly identified as South-West, North-West, North-East and South-East positions.

In one or more embodiments, light radiation sources 140, 142 may therefore be arranged in a plurality of arrays (e.g. the four arrays of FIG. 3), wherein:

each array in the plurality of arrays comprises at least one light radiation source of the first set (e.g. a blue LED 140) arranged off-centre in a respective direction (D1, D2, D3, D4—always referring to FIG. 3) from the centre of the array, and the arrays of the plurality of arrays are arranged with different orientations of the respective directions D1, D2, D3, D4, e.g. with orientations mutually rotated by 90°.

One or more embodiments may admit various modifications in the implementation.

For example, one or more embodiments may envisage a ratio of blue to red sources which is different from 1:24.

Moreover, in a modular system as exemplified in FIG. 3, different modules may have all the same ratio of blue to red sources, or may have different ratios. This approach offers the possibility of "fine-tuning" the irradiance level e.g. of blue light, or of modifying, according to the application needs, the irradiance homogeneity.

In one or more embodiments, in a (5×5) array of 25 sources as exemplified in the Figures, the presence of a higher number of blue sources may be envisaged, e.g. so as to obtain a ratio of 2:23. In this case the location of blue sources may satisfy specular symmetry or rotational symmetry conditions, once again through a rotation (e.g. by 90°) of the mounting positions, as previously exemplified with reference to FIG. 3.

For example, an arrangement featuring a rotational symmetry may be employed when, according to particular application needs, a single-color lighting is desired (e.g. only red lighting). In this case, switching off blue sources does not originate a lack of uniformity in the radiation.

The above considerations lead to the realization that a certain ratio of the radiometric power of the first set to the radiometric power of the second set of light radiation sources (e.g. a ratio of approximately 0.05) may be achieved irrespective of a given ratio of the number of light sources in the first set 140 to the number in the second set 142 (e.g. 1:24).

In other words, a ratio of radiometric powers amounting to 0.05 may be achieved with a ratio of the number of sources other than 1:24.

For example, while in one or more embodiments the radiometric power of the LEDs may be left unvaried by an optional dimming function, in one or more embodiments the radiometric power of blue and red LEDs may be changed selectively through a selective dimming action, e.g. in order to balance the blue to red radiometric power ratio.

This may be done without changing the ratio of the number of sources in both sets.

In one or more embodiments, a dimming function may be used e.g. to simulate the circadian rhythm of the plants which occurs in a natural environment.

E.g. during the morning or the evening the red light may be more intense, thus simulating the light of the Sun, which in the morning and in the evening is closer to the horizon, and therefore sun rays must pass a large portion of the atmosphere and are subjected to Rayleigh scattering, proportional to the factor $(1/\lambda)^4$, wherein $\lambda$ is the wavelength of the radiation. During the day the blue light is more intense than in the morning or in the evening; a dimming function may therefore simulate the variation of the blue and the red light components along 24*h* in a greenhouse.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A lighting device comprising a substrate with an array of electrically-powered light radiation sources, wherein the sources in said array are arranged in a first set and a second set to emit a blue radiation and a red radiation, respectively;
wherein said light radiation sources are arranged in a plurality of arrays, wherein:
each array in said plurality of arrays includes at least one light radiation source in said first set arranged off-centre in a respective direction with respect to the centre of the array, and
the arrays of said plurality of arrays are arranged with said respective directions having different orientations.

2. The lighting device of claim 1, wherein said blue radiation and said red radiation are around 444 nm and 660 nm, respectively.

3. The lighting device of claim 1, wherein said light radiation sources are arranged side-by-side to form a densely clustered array.

4. The lighting device of claim 3, wherein said light radiation sources have square packages.

5. The lighting device of claim 1, wherein:
the ratio of the radiometric power of said first set to the radiometric power of said second set of light radiation sources is about 0.05, and/or
the ratio of the numbers of light radiation sources in said first set and in said second set is about 1:24.

6. The lighting device of claim 1, wherein said light radiation sources are arranged in at least one parallelogram matrix.

7. The lighting device of claim 1, wherein said array includes at least one light radiation source in said first set in a central position of the array surrounded by a plurality of light radiation sources in said second set.

8. The lighting device of claim 1, wherein:
said plurality of arrays includes four arrays, and
said four arrays are arranged with said respective directions having orientations mutually rotated by 90°.

9. The lighting device of claim 1, further comprising a flared reflector to direct light radiation from said light radiation sources towards a lighting area.

10. The lighting device of claim 9, further comprising, at the output of said reflector, a cover of a material permeable to the radiation of said light radiation sources.

11. The lighting device of claim 1, wherein said light radiation sources include LED sources.

12. A method of using a lighting device, the lighting device comprising a substrate with an array of electrically-powered light radiation sources, wherein the sources in said array are arranged in a first set and a second set to emit a blue radiation and a red radiation, respectively;
the method comprising varying a ratio between radiometric powers of the radiation emitted by the first set and the radiation emitted by the second set of light radiation sources.

13. The method of claim 12, wherein said light radiation sources are arranged in a plurality of arrays, wherein:
each array in said plurality of arrays includes at least one light radiation source in said first set arranged off-centre in a respective direction with respect to the centre of the array, and
the arrays of said plurality of arrays are arranged with said respective directions having different orientations.

14. A lighting device comprising a substrate with an array of electrically-powered light radiation sources, wherein the sources in said array are arranged in a first set and a second set to emit a blue radiation and a red radiation, respectively;
wherein said light radiation sources are arranged in a plurality of arrays, wherein:
each array in said plurality of arrays includes at least one light radiation source in said first set arranged off-centre in a respective direction with respect to the centre of the array, and
the arrays of said plurality of arrays are arranged with said respective directions having different orientations,
wherein the orientations have a rotations that is 90°.

* * * * *